Mar. 27, 1923.

J. B. JOHNS

WHEEL LOCK

Filed Mar. 11, 1922

WITNESSES

INVENTOR
John B. Johns
BY
ATTORNEYS

Mar. 27, 1923.
J. B. JOHNS
WHEEL LOCK
Filed Mar. 11, 1922
1,450,153
3 sheets-sheet 2.
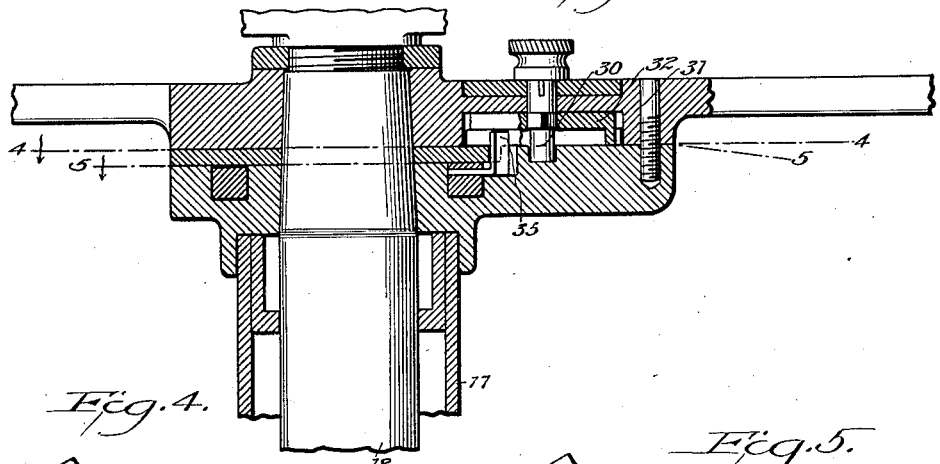
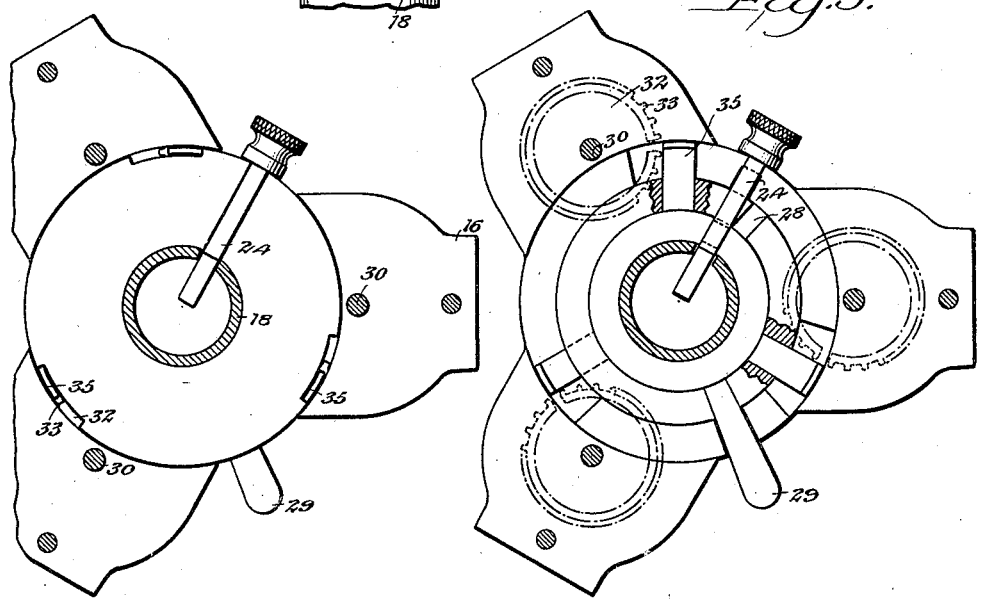
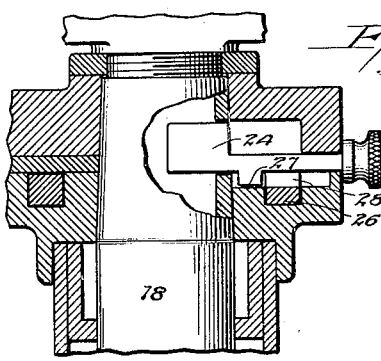
WITNESSES
INVENTOR
John B. Johns
BY
ATTORNEYS Mar. 27, 1923.

J. B. JOHNS

WHEEL LOCK

Filed Mar. 11, 1922

WITNESSES

INVENTOR
John B. Johns
BY
ATTORNEYS

Patented Mar. 27, 1923.

1,450,153

UNITED STATES PATENT OFFICE.

JOHN B. JOHNS, OF WARREN, OHIO.

WHEEL LOCK.

Application filed March 11, 1922. Serial No. 542,986.

*To all whom it may concern:*

Be it known that I, JOHN B. JOHNS, a citizen of the United States, and resident of Warren, in the county of Trumbull and State of Ohio, have invented a new and Improved Wheel Lock, of which the following is a full, clear, and exact description.

My invention relates to a lock, and aims to provide a device of this nature primarily adapted to be associated with a wheel, and more particularly a steering wheel such as is utilized in connection with motor vehicles, although it is not necessarily limited to this particular adaptation.

It is an object of this invention to provide a device of the character stated which shall be in the nature of a permutation lock, so that a person authorized to actuate the wheel will not find it necessary to employ and carry keys to release or set the lock, incident to the fact that the necessary combination may be carried in the mind of the operator.

A further object of this invention is that of constructing a lock of the type specified which shall be extremely simple in construction, and in which it will be impossible for an unauthorized person to actuate the wheel without knowledge of the necessary combination serving to effect a release of the lock parts.

Still further objects of this invention will become apparent in the annexed specification, and taken in connection with the drawings, which latter illustrate practical embodiments of the same, and in which;

Figure 3 is a transverse sectional view of the parts as shown in Figures 1 and 2.

Figure 4 and Figure 5 are sectional plan views taken in the direction of the arrows indicated in Figure 3.

Figure 6 is an enlarged sectional side view of the parts as shown in Figures 1 to 5.

Figure 1:
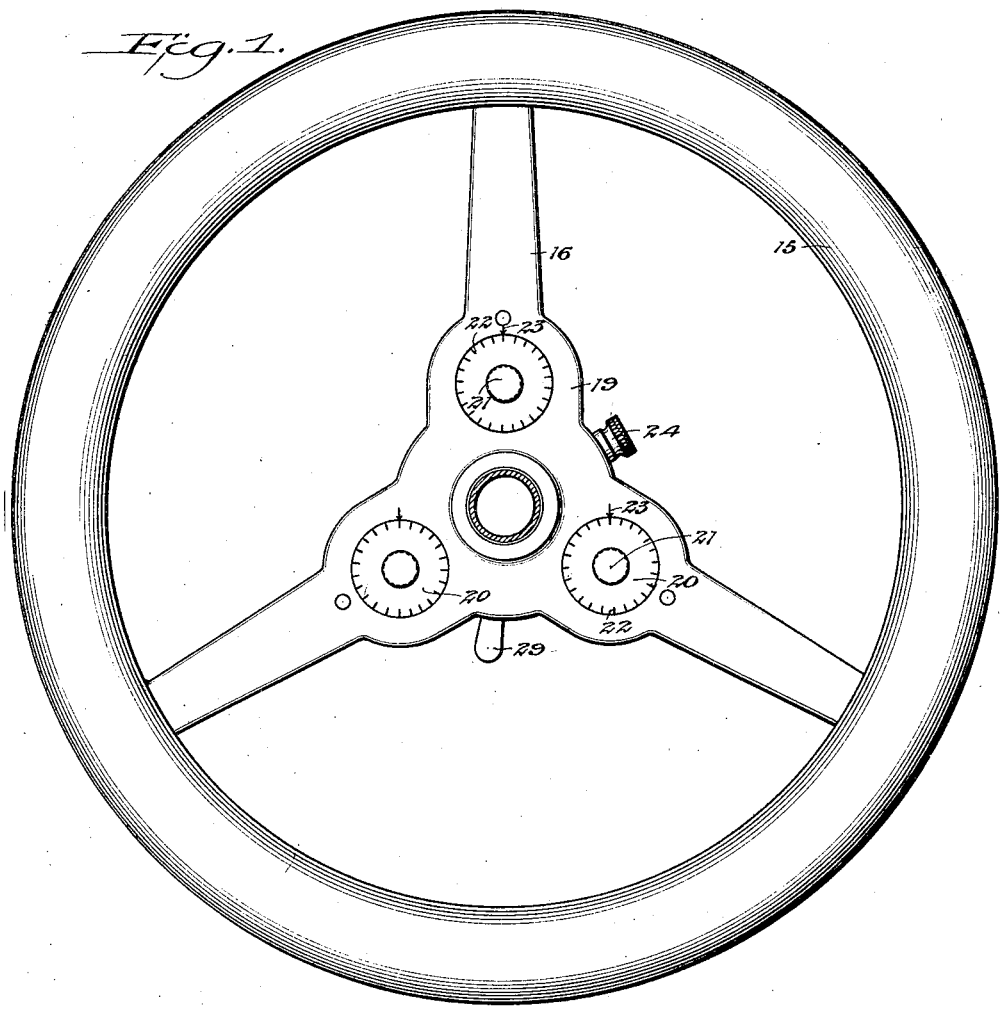
Figure 1 is a plan view of the steering wheel and having my improved type of lock associated therewith.

It will be seen reference being had to Figure 1 that I have illustrated a steering wheel including a conventional ring 15 which is supported by spokes 16, and is carried by the post casing 17, enclosing a steering post 18.

Contrary to conventional construction, however, it will be noted that in the embodiment illustrated I have provided the spokes 16 with an enlarged portion 19, and this enlarged portion carries the mechanism which effects the locking operation. Thus it will be seen as in Figure 1 that the exterior portion of the lock presents a series of operating dials 20 which may be carried one by each of the spokes 16 and these dials are provided with knobs 21 by means of which they may be rotated to bring their graduations 22 into alignment with suitable indicating means 23.

Now with a view of coupling the wheel to the post 18 it will be seen, reference being had to Figures 4, 5 and 6, that a pin 24 is carried by the body of the wheel and extends through an opening 25 in the post 18. Thus it will be obvious that upon the wheel being rotated the post will turn with the same to effect a steering of the vehicle.

Figure 7:
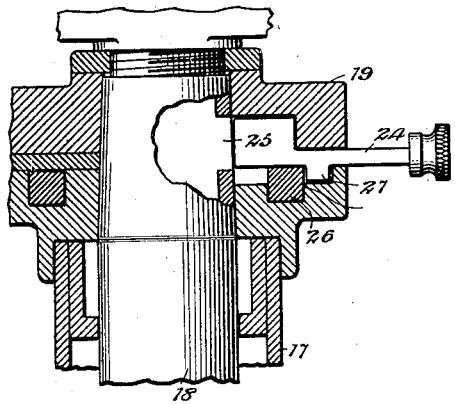
Figure 7 is a view similar to Figure 6 but showing a slightly different form of construction than that illustrated in the figures aforementioned, and also showing parts in their released position.
Figure 8:
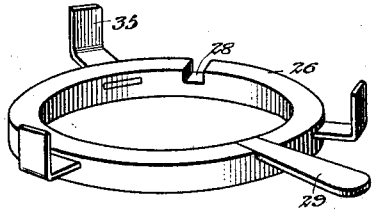
Figure 8 is a perspective view of a detail of construction.

However as in Figure 7 it will be obvious that the pin may be retracted and when the parts are in this position it will be seen that the end of the said pin will not extend through the opening in the post 18, and accordingly the wheel may rotate freely with respect to the post thus preventing any steering of the vehicle.

To provide means serving to normally prevent a retraction or projection of this pin it will be noted that I employ a ring 26 and the pin 24 is formed with a downwardly extending portion 27 which is adapted to lie to either side of the ring 26 thus preventing the pin from being moved from that position into which it has been extended. However the ring 26 is formed with a slot 28 of a depth permitting of the passage of the downwardly extending portion 27 of the pin, and the ring may be moved by a handle 29 so that the slot 28 may be brought into the path of travel of the pin and the downwardly extending portion thereof. Thus although the pin is normally incapable of movement the wheel may be coupled with or detached from the post 18 by actuating the handle 29 to bring the slot 28 and portion 27 into register with each other whereupon the pin may be freely moved to effect the result desired.

Figure 2:
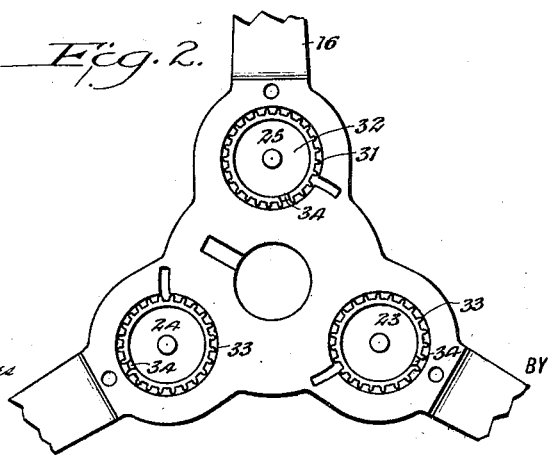
Figure 2 is a fragmentary view of certain of the parts as shown in Figure 1, but having certain of the parts removed to disclose underlying construction.

To now provide a structure which will normally preclude of the wheel being coupled to and detached from the post in the manner aforementioned it will be noted that each of the dials 20 has secured to it a stem 30 and each of these stems fixedly carries a gear 31 having an off-set portion 32. Also it will be seen that the number of teeth 33, in each of the gears 31, varies as in Figure 2, for a purpose hereinafter stated, and an opening 34 is provided through the periphery of each of these gears. The ring 26 lies adjacent to the gears 31 and carries ears 35 which travel in a path interrupted by the gears aforementioned so that by virtue of the fact that these ears are fixedly secured to the ring the latter is incapable of being moved incident to the fact that the said ears will engage the gears.

Now in operation it will be seen assuming that the parts are in the position illustrated in Figure 7, that an operator may effect a coupling of the wheel to the post 18 by simply actuating the knobs 21, and consequently the dials 20 so that a certain graduation 22 of each of the latter corresponds with the proper indicating mark 23. When the parts are in this position (Figure 5) the ring 26 may readily be turned by means of its handle 29 incident to the fact that each of the ears 35 lies adjacent to the opening 34 of each of the gears 31. Thus the ring may be turned to bring the slot 28 into alignment with the portion 27 of the pin 24 and the latter may be projected subsequent to which the ring may again be turned to its normal position to prevent an accidental retraction of the pin.

However assuming that a person lacks the proper combination to effect the proper setting of the dials 20 it will be obvious that he will be incapable of bringing the openings 34 into proper position with respect to the ears 35. The purpose of the teeth 33 will now be obvious incident to the fact that it will be impossible for an unauthorized operator to press against the handle 29 and retract each of the dials individually until he feels that no more resistance is offered, to the proposed turning of the ring 26. More particularly this effect is to be predicated to the fact that the instant that the handle 29 is actuated to effect a movement of the ring 26, the ears 35 carried by the latter will come into contact with the teeth 33 of the gears and thus prevent a rotation of the dial. Also incident to the fact that the number of teeth on different gears varies it will be understood that these teeth will not register with the indicating marks 22 appearing upon the face of the dials 20, and so it will be also impossible for an unauthorized operator to set the dials properly by process of elimination.

Figure 9:
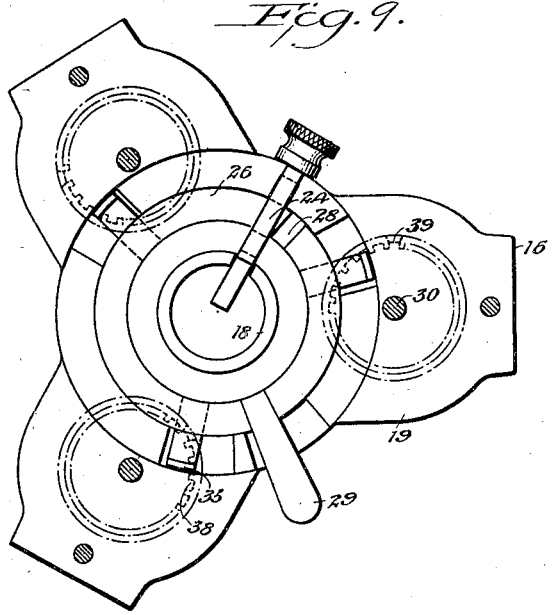
Figure 9 is a view of the device as shown in Figure 7.
Figure 10:
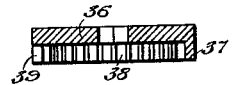
Figure 10 is a sectional side view of one of the locking elements utilized in connection with the structure shown in Figures 7 and 9.

Thus it will be understood that the objects of this invention are accomplished, and it will also be appreciated that the teeth may be formed either upon the exterior of the gears as in Figures 1 to 8, or upon the interior of the gears as in Figures 9 and 10. In this latter form it will be noted that gears 36 are provided, which gears are formed with a flanged periphery 37 having inwardly extending teeth 38, this flange being interrupted by an opening as at 39. Thus in this type of lock the operation is in all respects similar to that aforementioned, incident to the fact that if an unauthorized operator brings a rotational force upon the ring 26 until such time as the ears 35 carried by the latter do not meet with resistance, or in other words are aligned with the openings 39 of the gears, these ears will engage the teeth 38, as in Figure 9 and prevent a turning of the dials and gears carried thereby.

From the foregoing it will be appreciated that this invention will accomplish the results desired incident to the fact that it will be virtually impossible for an unauthorized person to effect a coupling of the steering wheel with the post without previous knowledge of the necessary combination which will permit of this coupling being accomplished.

It will also be understood that numerous modifications of structure might readily be resorted to without in the least departing from the scope of my claims which are;

1. A lock including in combination a post, a wheel carried by said post and normally rotatable with respect thereto, said post being formed with an opening, a pin slidably carried by said wheel, said pin being adapted to be extended into said opening whereby to couple said wheel and post, a ring adapted to lie adjacent to said pin whereby to normally prevent a movement of the latter, means for deliberately moving said ring, and a lock including ears carried by said ring, and rotatable members positioned adjacent to said ears, said members being formed with slots adapted to accommodate said ears.

2. A lock including in combination a post, a wheel carried by said post and normally rotatable with respect thereto, said post being formed with an opening, a pin slidably carried by said wheel, said pin being adapted to be extended into said opening whereby to couple said wheel and post, a ring adapted to lie adjacent to said pin whereby to normally prevent a movement of the latter, means for deliberately moving said ring, and a lock including ears carried by said ring, rotatable members positioned adjacent to said ears, said members being formed with slots adapted to accommodate said ears, and a series of teeth formed in said members.

3. A lock including in combination a post, a wheel carried by said post and normally rotatable with respect thereto, said post being formed with an opening, a pin slidably carried by said wheel, said pin being adapted to be extended into said opening whereby to couple said wheel and post, a ring adapted to lie adjacent to said pin whereby to normally prevent a movement of the latter, means for deliberately moving said ring, a lock including ears carried by said ring, rotatable members positioned adjacent to said ears, said members being formed with slots adapted to accommodate said ears, a series of teeth formed in said members, and dials coupled to said members.

4. A lock including a dial, a stem secured to said dial, a gear carried by said stem, said dial being provided with graduations, teeth forming a part of said gear, said teeth being interrupted by a slot, and detent means for the lock including a member movable in a fixed path, said path including said slot in a certain angular adjustment with said gear; the number of teeth on said gear varying with respect to the number of graduations on said dial.

5. A lock including a plurality of dials, graduations carried by said dials, and an indicating mark for each of said dials, a stem secured one to each of said dials, a gear secured one to each of said stems, teeth forming a part of said gears, the number of teeth in each gear varying with respect to the number in an adjacent gear.

6. A lock including a plurality of dials, graduations carried by said dials, and an indicating mark for each of said dials, a stem secured one to each of said dials, a gear secured one to each of said stems, teeth forming a part of said gears, the number of teeth in each gear varying with respect to the number in an adjacent gear, but all dials carrying graduations similarly spaced aligned with respect to the graduations carried by the dial.

JOHN B. JOHNS.